US012726484B2

(12) United States Patent
Meyer

(10) Patent No.: US 12,726,484 B2
(45) Date of Patent: Sep. 1, 2026

(54) PROGRESSIVE STAND IN PROCESSING

(71) Applicant: Visa International Service Association, San Francisco, CA (US)

(72) Inventor: Kobus Cornelius Meyer, Morrison, CO (US)

(73) Assignee: Visa International Service Association, San Francisco, CA (US)

( * ) Notice: Subject to any disclaimer, the term of this patent is extended or adjusted under 35 U.S.C. 154(b) by 94 days.

(21) Appl. No.: 18/427,701

(22) Filed: Jan. 30, 2024

(65) Prior Publication Data

US 2025/0247399 A1 Jul. 31, 2025

(51) Int. Cl.
*G06F 7/04* (2006.01)
*G06F 15/16* (2006.01)
*H04L 9/40* (2022.01)
*H04L 29/06* (2006.01)

(52) U.S. Cl.
CPC .................................. *H04L 63/108* (2013.01)

(58) Field of Classification Search
CPC ..................................................... H04L 63/108
USPC ............................................................. 726/4
See application file for complete search history.

(56) References Cited

U.S. PATENT DOCUMENTS 9,842,336 B2 12/2017 Liu et al.
10,249,101 B2 4/2019 Hammad et al.
10,282,709 B2 5/2019 Basu et al.
10,574,657 B1 * 2/2020 Govil ........................ H04L 1/22
2014/0025571 A1 * 1/2014 Dooley .................. G06Q 20/14 705/40
2014/0304158 A1 * 10/2014 Basu .................. G06Q 20/4016 705/44
2017/0300903 A1 10/2017 Mori et al.
2021/0192641 A1 6/2021 Das et al.
2022/0141180 A1 * 5/2022 Bhasin .................... H04L 69/40 726/1
2022/0366412 A1 11/2022 Mori et al.

* cited by examiner

*Primary Examiner* — Jeffrey C Pwu
*Assistant Examiner* — Samuel Ambaye
(74) *Attorney, Agent, or Firm* — Kilpatrick Townsend & Stockton LLP

(57) ABSTRACT

A method is disclosed. The method includes receiving from a resource provider computer, an authorization request message with a value for a transaction. The method includes transmitting the authorization request message comprising the value to an authorizing entity computer, and determining that an authorization response message in reply to the authorization request message has not been received, and that a time since the authorization request message was transmitted exceeds a time threshold. If the value in the authorization request message is below or equal to a value threshold, the server computer generates an authorization response message on behalf of the authorizing entity computer and transmits it to the resource provider computer. If the value in the authorization request message is above the value threshold, then the server computer continues to wait for an authorization response message from the authorizing entity computer.

20 Claims, 6 Drawing Sheets

| MTI | Description | Sent | Hold | Auth |
|---|---|---|---|---|
| 0100 | Authorization Request | Yes | | No |
| 0120 | Authorization Advice | Yes | | No |
| 0200 | Financial Request | Yes | | No |
| 0220 | Financial Advice | Yes | | No |
| 0300 | Acquirer Rile Update | Yes | | No |
| 0420 | Reversal Request | Yes | | No |
| 0430 | Reversal Advice | Yes | | No |
| 0600 | Administrative Request | Yes | | No |
| 0800 | Network Management Request | Yes | | No |
| 0820 | Network Management Advice | Yes | | No |

FIG. 5A

| MTI | Description | Sent | Hold | Auth |
|---|---|---|---|---|
| 0100 | Authorization Request | Yes | | No |
| 0120 | Authorization Advice | Yes | | No |
| 0200 | Financial Request | Yes | | No |
| 0220 | Financial Advice | Yes | | No |
| 0300 | Acquirer Rile Update | | Yes | No |
| 0420 | Reversal Request | Yes | | No |
| 0430 | Reversal Advice | Yes | | No |
| 0600 | Administrative Request | | Yes | No |
| 0800 | Network Management Request | | Yes | No |
| 0820 | Network Management Advice | | Yes | No |

FIG. 5B

| MTI | Description | Sent | Hold | Auth |
|---|---|---|---|---|
| 0100 | Authorization Request | Yes | | No |
| 0120 | Authorization Advice | | Yes | No |
| 0200 | Financial Request | Yes | | No |
| 0220 | Financial Advice | | Yes | No |
| 0300 | Acquirer Rile Update | | Yes | No |
| 0420 | Reversal Request | Yes | | No |
| 0430 | Reversal Advice | | Yes | No |
| 0600 | Administrative Request | | Yes | No |
| 0800 | Network Management Request | | Yes | No |
| 0820 | Network Management Advice | | Yes | No |

FIG. 5C

| MTI | Description | Sent | Hold | Auth |
|---|---|---|---|---|
| 0100 | Authorization Request | Yes | <$25 | Yes |
| 0120 | Authorization Advice | | Yes | No |
| 0200 | Financial Request | Yes | <$25 | Yes |
| 0220 | Financial Advice | | Yes | No |
| 0300 | Acquirer Rile Update | | Yes | No |
| 0420 | Reversal Request | Yes | | No |
| 0430 | Reversal Advice | | Yes | No |
| 0600 | Administrative Request | | Yes | No |
| 0800 | Network Management Request | | Yes | No |
| 0820 | Network Management Advice | | Yes | No |

FIG. 5D

PROGRESSIVE STAND IN PROCESSING

CROSS-REFERENCES TO RELATED APPLICATIONS

None.

BACKGROUND

In a typical transaction flow, when a user provides a credential to a resource provider computer to conduct a transaction, the resource provider computer transmits an authorization request message comprising the credential to an authorizing entity computer via a server computer to determine if the transaction is authorized. In some instances, the authorizing entity computer can malfunction or fail to respond to the authorization request message. If this occurs, then the server computer can stand in for the authorizing entity computer and make authorization decisions on behalf of the authorizing entity computer. The server computer can apply stand in processing rules to incoming authorization request messages to authorize or decline them on behalf of the authorizing entity computer.

In some cases, however, the authorizing entity computer delays responding to authorization request messages and these delays may cause the server computer to automatically invoke the stand in processing rules. The delays may be caused by a number of reasons including excessive network traffic experienced by the authorizing entity computer.

While performing stand in processing is useful in such situations, it can be undesirable for the server computer to automatically invoke them in all situations. Authorizing entity computers typically have more recent and accurate information to determine whether or not transactions should be authorized. For example, recent hacking or fraudulent activity associated with an account may be known to the authorizing entity operating the authorizing entity computer, but may not be known to the server computer. The server computer may not have access to such information. As such, authorization request messages could be approved by the server computer, where they might have been declined by the authorizing entity computer.

Embodiments of the invention address these and other problems, individually and collectively.

BRIEF SUMMARY

One embodiment of the invention is directed to a method comprising: receiving, by a server computer from a resource provider computer, an authorization request message comprising a value for a transaction; transmitting, by the server computer, the authorization request message comprising the value to an authorizing entity computer; determining, by the server computer, that an authorization response message in reply to the authorization request message has not been received, and that a time since the authorization request message was transmitted exceeds a time threshold; if the value in the authorization request message is below or equal to a value threshold, generating, by the server computer, an authorization response message on behalf of the authorizing entity computer and transmitting the authorization response message to the resource provider computer, and if the value in the authorization request message is above the value threshold, then continuing waiting for an authorization response message from the authorizing entity computer Another embodiment of the invention is directed to a server computer comprising a processor and a computer readable medium comprising code, executable by the processor, for implementing a method comprising: receiving, from a resource provider computer, an authorization request message comprising a value for a transaction; transmitting the authorization request message comprising the value to an authorizing entity computer; determining that an authorization response message in reply to the authorization request message has not been received, and that a time since the authorization request message was transmitted exceeds a time threshold; if the value in the authorization request message is below or equal to a value threshold, generating an authorization response message on behalf of the authorizing entity computer and transmitting the authorization response message to the resource provider computer, and if the value in the authorization request message is above the value threshold, then continuing waiting for an authorization response message from the authorizing entity computer.

These and other embodiments of the invention are described in further detail below.

BRIEF DESCRIPTION OF THE DRAWINGS

FIGS. 5A-5D show specific illustrations of rules and how rules can be adjusted in embodiments depending upon response times from authorizing entity computers.

DETAILED DESCRIPTION

Figure 1:
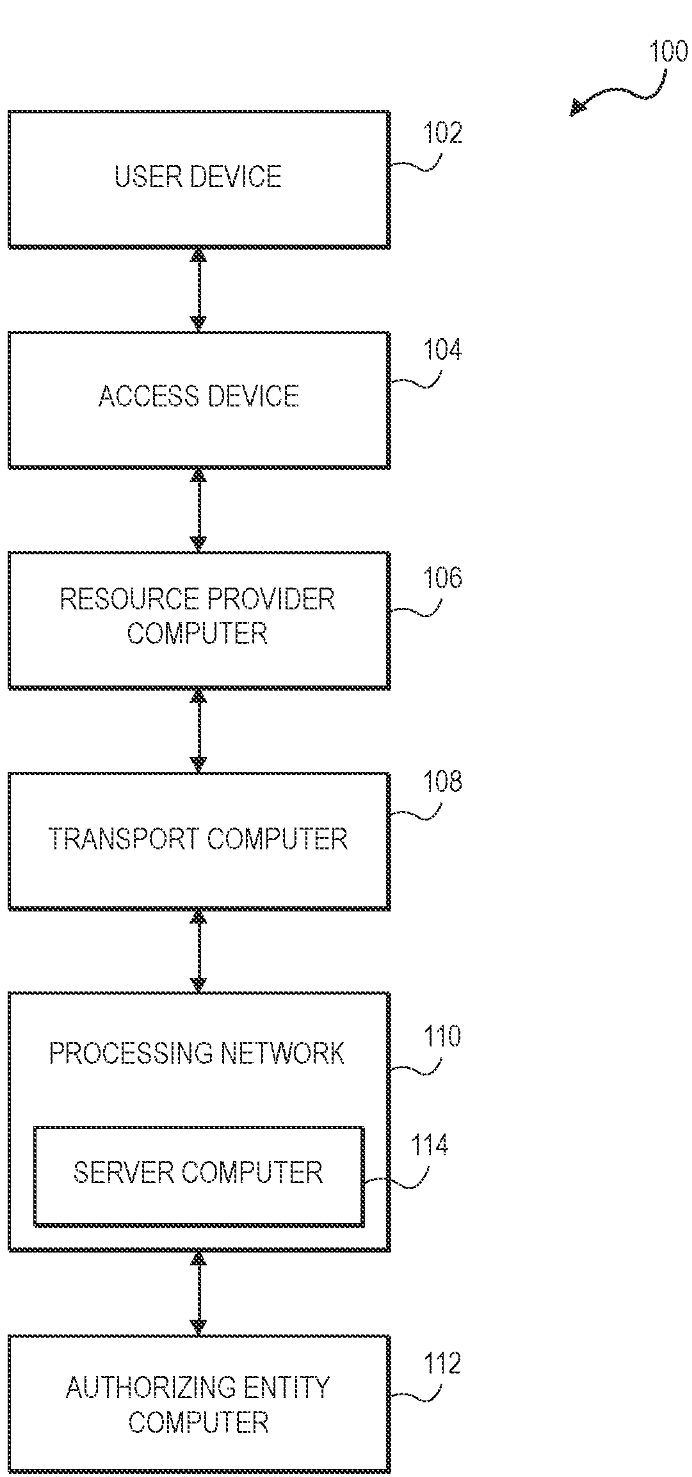
FIG. 1 illustrates a block diagram of a system for processing transactions in one embodiment of the invention.

Methods for improved processing of transactions are disclosed. In one embodiment, the method includes receiving from a resource provider computer, an authorization request message with a value for a transaction. The method includes transmitting the authorization request message comprising the value to an authorizing entity computer, and determining that an authorization response message in reply to the authorization request message has not been received, and that a time since the authorization request message was transmitted exceeds a time threshold. If the value in the authorization request message is below or equal to a value threshold, the server computer generates an authorization response message on behalf of the authorizing entity computer and transmits it to the resource provider computer. If the value in the authorization request message is above the value threshold, then the server computer continues to wait for an authorization response message from the authorizing entity computer.

Embodiments of the invention have a number of technical advantages. Embodiments of the invention can automatically invoke rules that can adjust the number of types of authorization request messages that are transmitted to an authorizing entity computer. This number and/or type of messages transmitted to the authorizing entity computer can be dependent upon the ability of the authorizing entity computer to respond to authorization request messages in a timely manner. Contrary to conventional systems, a server computer in embodiments of the invention does not need to perform stand in processing for all authorization request messages sent to the authorizing entity computer if it detects a problem with respect to the authorizing entity computer.

Prior to discussing embodiments of the invention, a description of some terms may be helpful in understanding embodiments of the invention.

A "user" may include an individual. In some embodiments, a user may be associated with one or more personal accounts and/or mobile devices. The user may also be referred to as a cardholder, account holder, or consumer in some embodiments.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

A "resource provider" may be an entity that can provide a resource such as goods, services, information, and/or access to a location (e.g., a parking space, a transit terminal, etc.). Examples of resource providers include merchants, governmental authorities, secure data providers, etc. A resource provider may operate one or more access devices.

An "access device" may be any suitable device for providing access to an external computer system. An access device may be in any suitable form. Some examples of access devices include point of sale (POS) devices, cellular phones, PDAS, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "activity" may refer to an action or a behavior. For example, an electronic transaction activity may refer to exchange of transaction data between two or more electronic entities. In some embodiments, monitoring electronic transaction activity of an issuer may include monitoring or observing authorization traffic of the issuer, e.g., authorization requests and responses to determine the issuer's behavior. For example, a processing network may monitor authorization responses received from an issuer to determine if the issuer is providing authorization responses to authorization requests in a timely manner and/or in accordance with historical authorization rates.

An "authorizing entity" may refer to an entity that is configured to authorize a transaction. For example, an authorizing entity may be an issuer or an issuer processor that may receive an authorization request message for a transaction involving purchase of goods and/or services from a merchant. The authorizing entity may approve or decline a transaction based on a number of factors such as a credit limit, insufficient funds or fraud risk associated with a payment account used for the transaction. In some embodiments, the authorizing entity may authorize or decline a transaction using a set of processing rules.

"Stand-in" may refer to a substitute or in place of. For example, stand-in processing may refer to processing by an entity in place of another entity. In embodiments of the invention, if an authorizing entity is malfunctioning or experiencing other issues that prevent it from operating normally, then another entity can perform stand-in processing of authorization requests in place of the authorizing entity using stand-by processing rules.

"Processing rules" may refer to rules for processing a transaction. In some embodiments, the processing rules may include rules to determine if a transaction can be authorized or not. For example, the processing rules may include fraud rules to determine if the transaction is a legitimate transaction. In some embodiments, some of the processing rules may analyze information associated with a payment account used for the transaction to authorize the transaction.

A "delay rate" may refer to a number of delayed transactions in a certain time period. For example, if 5000 transactions were processed in an hour and 4000 of those transactions had authorization response messages received after an expected time, then the delay rate would be 80%. In some embodiments of the invention, a delay rate threshold may determine if the number of transactions delayed by an authorizing entity in a certain time period exceeds a certain acceptable value, the authorizing entity may be malfunctioning and specific rules regarding stand-in processing may be invoked.

A "timeout" may refer to absence of an activity for a period of time. For example, an activity may be an authorization response from an authorizing entity. In some embodiments, the period of time may be a predetermined value. In some embodiments, a predetermined number of timeouts within a predetermined period of time may indicate an abnormal behavior of an authorizing entity and stand-in processing may need to be invoked.

A "threshold" may refer to a transition point. For example, when a value exceeds a threshold, a certain action can be taken, and when the value stays equal to or less than the threshold, no action is taken.

An "authorization request message" may be an electronic message that is sent to a processing network and/or an issuer of a payment account to request authorization for a transaction. An authorization request message according to some embodiments may comply with ISO 8583, which is a standard for systems that exchange electronic transaction information associated with a payment made by a consumer using a payment device or payment account. The authorization request message may include an account identifier that may be associated with a payment device or a payment account associated with an issuer. An authorization request message may also comprise additional data elements corresponding to "identification information" including, by way of example only: a service code, a CVV (card verification value), a dCVV (dynamic card verification value), an expiration date, etc. An authorization request message may also include transaction information such as a transaction amount, a merchant identifier, a location of the transaction, a user's name and address, date and time of the transaction, as well as any other information that may be utilized in determining whether to identify and/or authorize a transaction.

An "authorization response message" may be an electronic message reply to an authorization request message generated by an authorizing entity or a processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing network) to the merchant's access device (e.g., POS equipment) that indicates approval of the transaction. The code may serve as proof of authorization. As noted above, in some embodiments, a processing network may generate or forward the authorization response message to the resource provider computer. It may also include any of the data in the authorization request message (e.g., a credential such as a PAN, a transaction identifier, etc.).

FIG. 1 illustrates a system 100 for processing transactions according to an embodiment of the invention.

The system 100 may include a user device 102, an access device 104, a resource provider computer 106, a transport computer 108, a processing network 110 and an authorizing entity computer 112. A user (not shown) may use the user device 102 to conduct a transaction with a merchant. The access device 104 and the resource provider computer 106 may be operated by a single merchant. The resource provider computer 106 may be in communication with the transport computer 108 and the processing network 110. The processing network 110 may comprise a server computer 114, and may be in communication with the authorizing entity computer 112, which may be an issuer or a processor computer. Note that various entities shown in FIG. 1 may communicate with one another using one or more communication networks, which are not shown for the ease of simplicity. The one or more communications networks may be based on any suitable communication protocol such as TCP/IP.

A user may conduct a transaction using the user device (e.g., a payment card) 102 and an access device (e.g., a POS terminal) 104 that may connect to the resource provider computer 106. The user device 102 may be any device that may be used to conduct a financial transaction, such as to provide payment information to a merchant. The user device 102 may be in any suitable form. Some non-limiting examples of the user device 102 may include payment cards (e.g., credit or debit cards), digital wallets, mobile devices (e.g., mobile phones, notebooks, laptops, tablets, PDAs, etc.), prepaid cards, etc.

The access device 104 may be any suitable device for communicating with the resource provider computer 106 and for interacting with the user device 102. The access device 104 may be a POS device, an mPOS terminal (e.g., a cell phone), a personal computer, an electronic cash register, etc. The access device 104 or the resource provider computer 106 may be configured to generate an authorization request message and forward it to the transport computer 108. The authorization request message may include transaction details (e.g., merchandise description, a transaction amount, quantity, a merchant identifier, etc.), payment details (a credential such as a consumer identifier or a payment account number, a token, an expiration date, etc.) and any other suitable information related to the transaction.

The transport computer 108 is typically a computer operated by entity such as an acquirer. The acquirer may be an entity (e.g., a bank) that has a business relationship with the particular merchant. The transport computer 108 may route the authorization request for the transaction to an authorizing entity computer 112 via the processing network 110.

The processing network 110 may include data processing subsystems, networks, and operations used to support and deliver authorization services, and clearing and settlement services. An example of processing network 110 includes VisaNet®, operated by Visa®. The processing network 110 may include wired or wireless network, including the internet. The processing network 110 may include a server computer 114. The server computer 114 may be configured to monitor electronic transaction activity of a plurality of transactions associated with an authorizing entity (e.g., authorizing entity computer 112), along with other authorizing entities. The server computer 114 may further be configured to analyze the electronic transaction activity data over a period of time to detect if the authorizing entity computer 112 is experiencing a systematic malfunction and may provide authorization decisions on behalf of the authorizing entity computer 112.

The authorizing entity computer 112 may be a computer that may be operated by an authorizing entity such as an issuer (e.g., a bank) or an issuer processor. The issuer may have issued the user device 102 or a payment account number (or another identifier) used for the transaction.

When a transaction uses a payment account associated with the authorizing entity, an authorization request message may be sent to the authorizing entity computer 112 via the processing network 110. The authorizing entity computer 112 may use a first set of processing rules to authorize the transaction. For example, the first set of processing rules may include rules to verify the information associated with the payment account used for the transaction (e.g., a payment account number, expiration date, account balance), the user information (e.g., name, address, phone number, etc.), the merchant information (e.g., merchant category, merchant location) and the transaction information (e.g., a transaction amount, date and time of the transaction). The authorizing entity computer 112 may generate an authorization response message including the authorization response. The authorization response message may be sent to the transport computer 108 via the processing network 110. Once received by the transport computer 108, the authorization response message may be sent to the access device 104. If the transaction is approved, the transaction may be completed and the user that conducted the transaction may be notified that the transaction was successfully completed.

When the authorizing entity computer 112 does not respond for some reason (e.g., due to a computer malfunction, unavailability of the connection, or significant delays in responding to authorization request messages), the processing network 110 may invoke stand-in processing rules which may allow the processing network 110 or another entity to respond to transactions on behalf of the issuer or issuer processor using a second set of processing rules. In some examples, the first set of processing rules and the second set of processing rules can be similar if the authorizing entity computer 112 provided the second set of processing rules to the processing network 110.

At the end of the day or at some other suitable time interval, a clearing and settlement process between the resource provider computer 106, the transport computer 108, the processing network 110, and the authorizing entity computer 112 may be performed with respect to the transaction.

Figure 2:
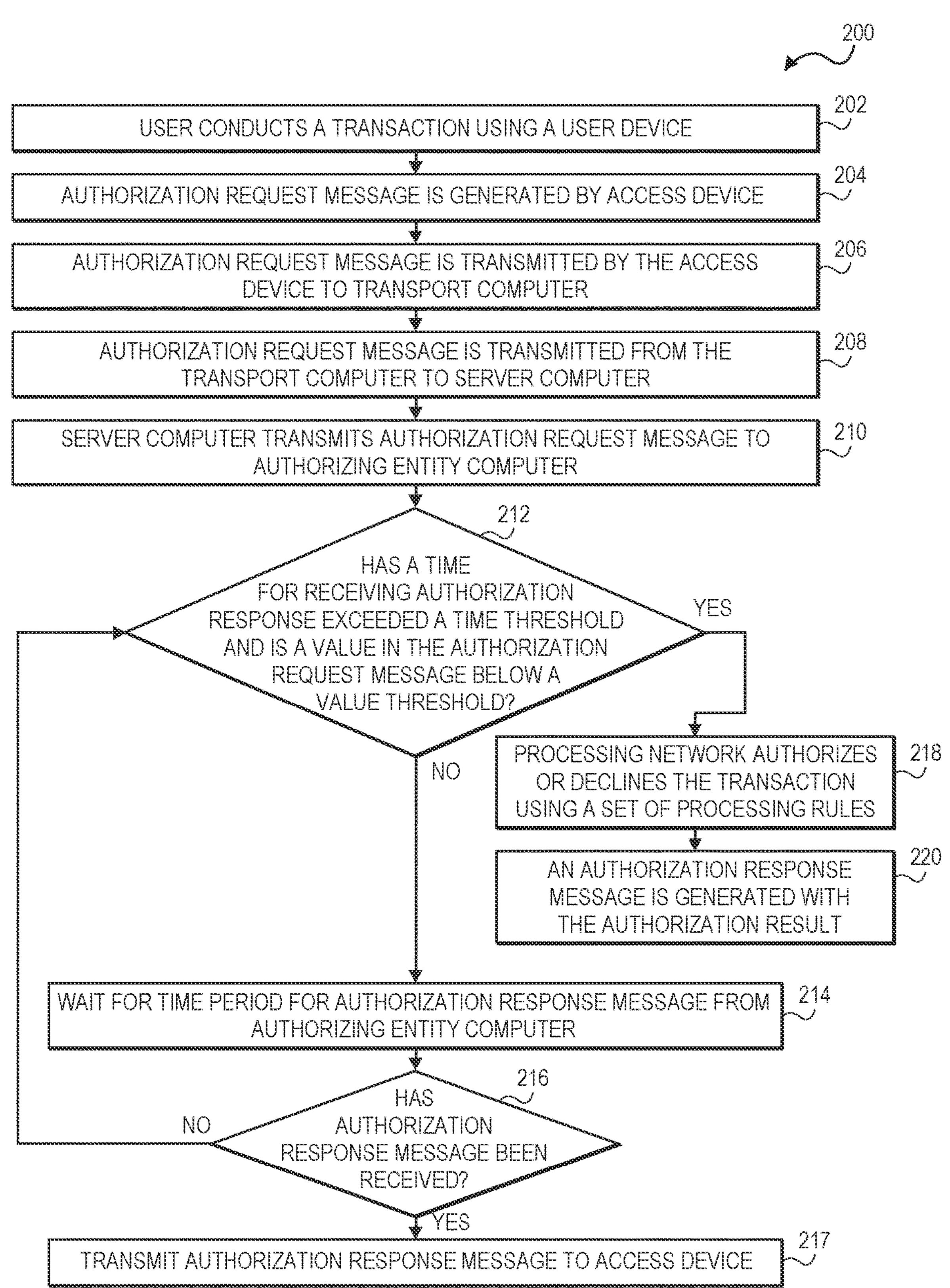
FIG. 2 illustrates a flowchart that can be used to illustrate methods according to embodiments of the invention.

FIG. 2 illustrates a process flow for a method to process a transaction in the context of the process described with respect to FIG. 1 in some embodiments of the invention.

In step 202, a user may conduct a transaction using a user device. As discussed with reference to FIG. 1, a user may use the user device 102 to conduct a transaction with a merchant using the access device 104. The access device 104 may be coupled to the resource provider computer 106. The user may conduct the transaction using a payment account that may be associated with an authorizing entity (e.g., an issuer) that operates the authorizing entity computer 112.

In step 204, an authorization request message may be generated by the resource provider computer 106. The authorization request message may include transaction information such as a transaction amount, a merchant identifier, date and time of the transaction, a location of the transaction, a transaction identifier, a credential such as an account identifier, a username and address, a phone number and any other relevant information. If the transaction was conducted online, the transaction information may also include an IP address of a user's computer, an email address, etc. An account identifier may be a payment account number, a token, a digital wallet identifier, or any such identifier associated with an issuer.

In step 206, the authorization request message may be transmitted by the resource provider computer 106 to the transport computer 108.

In step 208, the transport computer 108 may forward the authorization request message to the authorizing entity computer 112 via the processing network 110 (or the server computer 114 in the processing network 110).

In step 210, the processing network 110 may transmit the authorization request message to an authorizing entity computer. The server computer 114 in the processing network 110 can store data relating to the transmitted authorization request message in a temporary data storage, so that it can be matched to a corresponding authorization response message that is received from the authorizing entity computer 112. The server computer 114 in the processing network 110 can also start a timer after the authorization request message is transmitted to the authorizing entity computer 112. The server computer 114 can also store timer thresholds and value thresholds associated with various authorizing entity computers. Such timer and value thresholds can be used to determine whether stand-in processing rules are to be invoked by the server computer 114, and whether additional messages (e.g., advice messages) are or are not sent to the authorizing entity computer 112.

If the authorizing entity computer is operating normally, then the processing network 110 would receive a corresponding authorization response message in less than 1 minute, or possibly 5 minutes. If the amount of time exceeds 10 minutes, then the authorizing entity computer 112, or the network connections between the processing network 110 and the authorizing entity computer 112, may be malfunctioning, overloaded, or both.

If an authorization response message has been received before a time threshold, then the authorization response message from the authorizing entity computer 112 is transmitted, by the server computer 114, to the resource provider computer 106. In this scenario, the authorizing entity computer 112 is functioning normally and the processing rules at the server computer 114 are not invoked on behalf of the authorizing entity. In this scenario, steps 212-220 in FIG. 2 would not be performed. If an authorization response message has not been received from the authorizing entity computer 112 before the time threshold, then steps 212-220 in FIG. 2 would be performed.

In step 212, the server computer 114 in the processing network 110 may determine if the time for receiving an authorization response message for the transaction has exceeded the time threshold (in some cases compared with previous transaction response times using a preset time limit) and if the value in the authorization request message is below a value threshold. In some embodiments, based on predetermined time limits, the server computer 144 can invoke STIP for only specific transaction types, like advices, but can have no impact on authorization request messages, waiting to receive corresponding authorization response messages.

In some cases, the server computer 114 can determine that an authorization response message in reply to the authorization request message has not been received and that a time since the authorization request message was transmitted exceeds the time threshold. In step 218, if the value in the authorization request message is below or equal to a value threshold (e.g., $25), the server computer 114 can authorize or decline the authorization request message using a set of stand-in processing rules. In step 220, the server computer can then generate and transmit the authorization response message responsive to the authorization request message to the resource provider computer 106.

In step 214, if the value in the authorization request message is above the value threshold, then the server computer 114 can continue waiting for an authorization response message from the authorizing entity computer 112 for a period of time. For example, the period of time can be 1, 5, 10, etc. minutes.

In step 216, the server computer 114 determines if an authorization response message has been received by the server computer 114 from the authorizing entity computer 112.

If the authorization response message has been received by the server computer 114, then in step 217 the server computer 114 transmits the authorization response message to the access device 104 associated with the resource provider computer 106.

If the authorization response message has not been received by the server computer 114, then the evaluation in step 212 is performed again. The time threshold and value threshold rule for determining if stand in processing is to be performed may be the same as before, or may change. For example, in some embodiments, the time threshold can gradually decrease as time goes on, and the value threshold can remain the same or can increase.

Illustratively, some specific examples of rules that can be used to determine the processing load of the authorizing entity computer 112 such as an issuer computer and that can be used in step 212 above to invoke stand in processing (STIP) can include the following:

Rule 1—Authorization Transactions of $25 and below
 If (Issuer's Response Time>Previous 10 Minutes Response Time*1.10).
  Then Start STIP for Authorization Transactions<=$25

Rule 2—Authorization Transactions of $50 and below
 If (Issuer's Response Time>Previous 10 Minutes Response Time*1.20).
  Then Start STIP for Authorization Transactions<=$50

Rule 3—Authorization Transactions of $75 and below
 If (Issuer's Response Time>Previous 10 Minutes Response Time*1.30).
  Then Start STIP for Authorization Transactions<=$75

Rule 4—All Authorization Transactions
 If (Issuer's Response Time>Previous 10 Minutes Response Time*1.40).
  Then Start STIP for All Authorization Transactions In these rules, the server computer 114 dynamically progressively increases (e.g., in real-time and at specific time intervals such as every hour) the transaction amount (an example of a value threshold) where it will invoke the stand-in processing rules on behalf of the issuer as their response time progressively slows down. The average response time over a certain number of transactions over a predetermined time period can be determined, and then one of the above rules can be chosen based upon that. For example, the server computer 114 may determine that the average response time for the last 100 authorization requests in the last 10 minutes is 11.5 minutes. Based upon this, stand in processing would be performed for all transactions with values of $25 and below. In the above rules, the server computer 114 can start with transactions of $25 and below, then move to $50 and below, then $75 and below, and ultimately all transactions if the issuer's response time continues to slow down. This way, the server computer 114 ensures that transactions continue to be processed even if the issuer's response time is slowing down, thereby allowing the authorizing entity (e.g., an issuer) to review, analyze and approve of as many authorization request messages as possible. These rules are configurable per authorizing entity to look at response period, percentage deterioration or improvement and the dollar amounts for which the server computer takes up the transaction processing on-behalf of the authorizing entity computer 112.

The above same rules can be applied for financial advice messages that might also be sent to the authorizing entity computer 112. In some embodiments, the server computer stops or decreases the transmission of the number and/or type of advice messages (e.g., sends a subset of available advice message types) associated with transactions to the authorizing entity computer when the time associated with the expected response from the authorizing entity computer exceeds the time threshold. A financial advice message can be a message that informs the authorizing entity computer 112 about some aspect of an authorized transaction. For instance, an example of a financial advice message may include a message to an authorizing entity computer 112 from the server computer 114 that the amount of the transaction associated with a particular authorization request message that was approved by the authorizing entity computer 112 is different than the amount in the authorization request message. This can occur in a situation such as a pre-authorization transaction for the purchase of fuel where an authorization request message contains an amount and the authorizing entity computer 112 places a hold on the account for the transaction amount. After the user conducting the transaction finishes the fuel purchase, the amount of the purchase may be less than the authorized amount. Knowledge of the actual amount in an advice message can allow the authorizing entity computer 112 to release any amount held that is not necessary to pay for the actual amount of the transaction.

As more authorization request messages are transmitted by the server computer 114 to the authorizing entity computer 112, it is possible that the response time for authorization response messages from the authorizing entity computer improves. In this case, the server computer 114 can dynamically adjust the time and/or value thresholds in real-time over predetermined time periods or intervals (e.g., every hour) towards state where the server computer 114 does not perform any further stand-in processing on behalf of the authorizing entity computer 112. In this case, the time threshold and/or value thresholds may reduce over time as the authorizing entity computer's response time improves, thereby cause the server computer 114 to perform stand-in processing on fewer and fewer authorization request messages. Further, an improved response rate can cause the server computer 114 to send additional messages (e.g., advice messages) to the authorizing entity computer 112, that would be otherwise held by the server computer 114 if the authorizing entity computer 112 is not receiving or processing messages normally.

For example, the following rules can be invoked to show how different advice messages can be sent to the authorizing entity computer 112 if the number and timeliness of authorization response messages received from the authorizing entity computer improves:

Rule 1—Authorization Requests
 If (Issuer's Current Response Time<Previous 10 Minutes Response Time*0.90).
  Then Increase Authorization Requests by 10%
 If (Authorization Requests=100%).
  Then Proceed to Rule 2

Rule 2—Financial Advice Requests
 If (Issuer's Current Response Time<Previous 10 Minutes Response Time*0.90)·
  Then Increase Financial Advice Requests by 10%
 If (Financial Advice Requests=100%)·
  Then Proceed to Rule 3

Rule 3—All Remaining Advice Requests
 If (Issuer's Current Response Time<Previous 10 Minutes Response Time*0.90)·
  Then Increase All Remaining Advice Requests by 10%
 If (All Remaining Advice Requests=100%)·
  Then Maintain Current Request Rates In these rules, the server computer 114 is progressively increasing the amount of authorization requests, financial advice requests, and all remaining advice requests that the server computer 114 is sending as the authorizing entity's response time improves. The server computer 114 can start with authorization request messages, and once the server computer 114 receives authorization response messages for one hundred percent of the authorization request messages transmitted to the authorizing entity computer 112 within the expected time threshold, then it can start sending advice messages to the authorizing entity computer 112. This way, the server computer 114 ensures that it is utilizing the authorizing entity computer's improved response time to its fullest, thereby improving the overall efficiency of the system. These rules are configurable per the authorizing entity computer 112 to look at response period, percentage deterioration or improvement and the dollar amounts for which the server computer 114 takes up the transaction processing on-behalf of an authorizing entity such as an issuer.

The following JSON object can represent a set of rules for initiating progressive stand-in processing authorization transactions on behalf of authorizing entities (e.g., issuers) and ultimately stand-in processing for all transactions if the authorizing entity computer's (e.g., an issuer) response time continues to progressively slow down.

- The "rules" array contains a list of rules to be applied. In this case, there are four rules for Authorization transactions.
- The "id" field is a unique identifier for the rule.
- The "description" field is a human-readable explanation of what the rule does.
- The "priority" field determines the order in which the rules are applied. A lower number means higher priority.
- The "active" field indicates whether the rule is currently in use.
- The "effect" field indicates the action to be taken when the conditions of the rule are met.
- The "conditions" array contains a list of conditions that must be met for the rule to be applied. In all rules, the condition is that the issuer's response time progressively increases by a certain percentage within a 10-minute period.
- The "actions" array contains a list of actions to be taken when the rule's conditions are met. These actions initiate progressive stand-in processing authorizations transactions in increments of a certain amount on behalf of Issuers, and a message is logged to explain why this action was taken.

Similar rules for advice messages can use the same structure.

Some specific illustrations of rules and how they can be applied are shown in FIGS. 5A-5D. The message processing rules illustrated are invoked when the authorizing entity computer becomes increasingly less responsive. FIG. 5A shows that all types of messages are sent to an authorizing entity computer, and no stand-in processing is performed by the server computer. All systems are operating normally as expected. FIG. 5B shows a situation where the transaction flows have limited impact on advice messages and the server computer invokes a limited stand-in processing. As shown, authorization request messages are sent, but certain less time sensitive messages such as acquirer file updates are not sent to the authorizing entity computer. FIG. 5C shows a situation where the server computer holds all advice messages, but continues processing financial messages normally. FIG. 5D shows a situation where the server computer performs some stand-in processing for some financial messages such as authorization request messages under a specific threshold (e.g., those under $25) and there is a total hold on advice messages.

If the authorizing entity computer's response time continues to be slow or unresponsive, then complete stand-in processing can be performed by the server computer on behalf of the authorizing entity computer. In such a scenario, the number or percentage of authorization response messages to other authorization request messages transmitted to the authorizing entity computer within a specific time period that have not been received (e.g., 100% of the authorization request messages transmitted by the server computer to the authorizing entity computer do not have a corresponding authorization response message that has been received by the server computer) indicates that the authorizing entity computer is unable to respond and is possibly down or malfunctioning. The server computer can then transmit authorization responses messages on behalf of the authorizing entity computer for all subsequently received authorization requests messages. As the authorizing entity computer recovers, the reverse sequence of rules can be applied.

Figure 3:
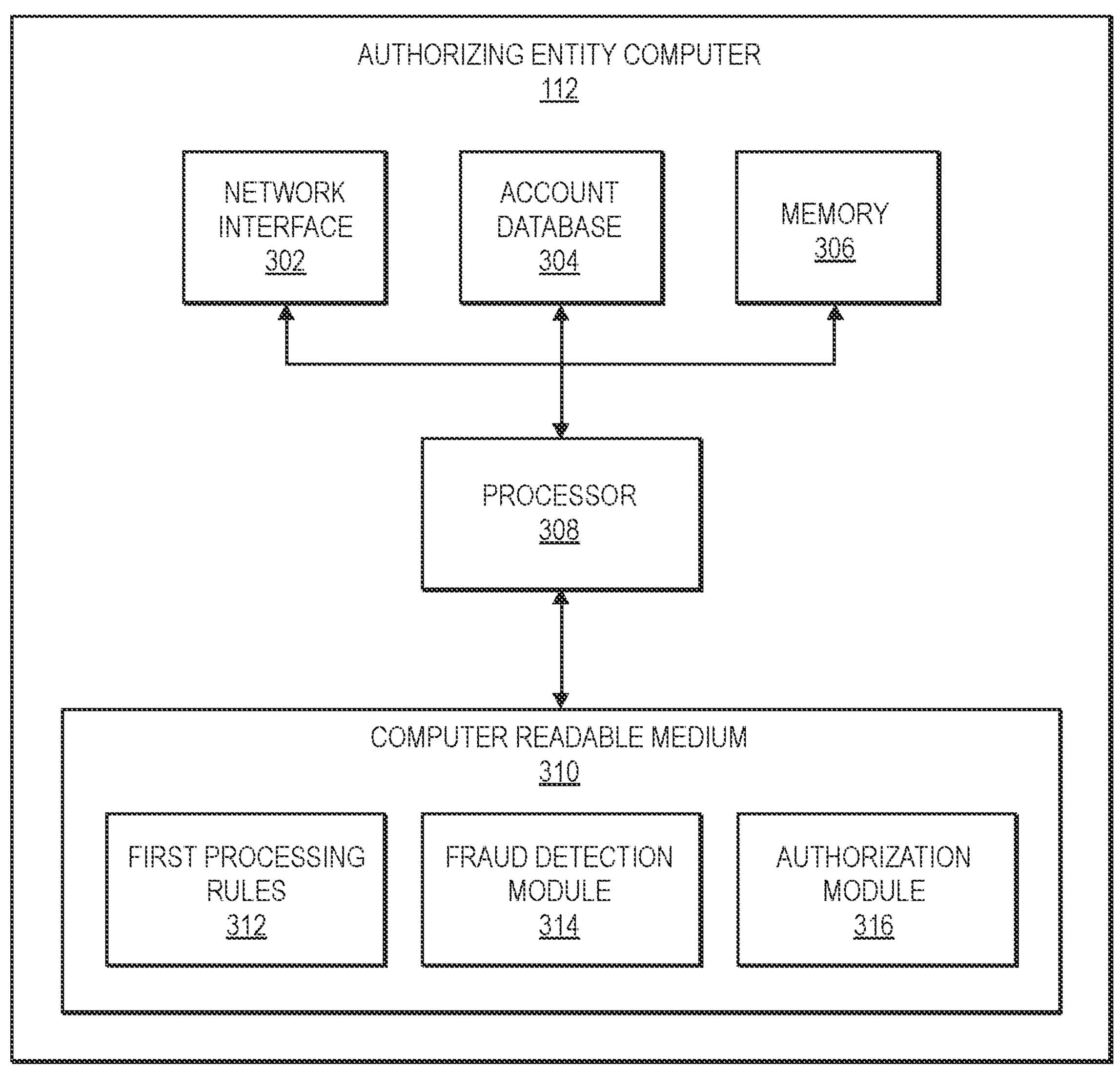
FIG. 3 illustrates a block diagram of an authorizing entity computer according to some embodiments of the invention.

FIG. 3 illustrates a block diagram of at least some components of an authorizing entity computer 112 according to some embodiments of the invention.

The authorizing entity computer 112 may include a network interface 302, an account database 304, a memory 306, a processor 308 and a computer readable medium 310. The authorizing entity computer 112 may be associated with an issuer, an issuer processor or another entity configured to authorize transactions.

The network interface 302 may be configured to interface with other entities, such as, the processing network 110, transport computer 108, resource provider computers, etc. for exchange of data and information (e.g., transaction and authorization related data) using various communication networks. The memory 306 may comprise any combination of volatile and/or non-volatile memory such as RAM, DRAM, ROM, flash, or any other suitable memory.

The processor 308 or processing elements may be configured to execute instructions or code in order to implement methods, processes or operations. The computer readable medium 310 may comprise code, executable by the processor 308, for implementing methods using embodiments of the invention. The CRM 310 may comprise first processing rules 312, a fraud detection module 314 and an authorization module 316.

The account database 304 may be externally (e.g., cloud) or internally coupled to the processor 308. The account database 304 may be configured to store account holders' payment account information such as payment account numbers, expiration dates, account balances, credit limits, etc. and account holders' personal identification information such as names, addresses, phone numbers, email addresses, IP addresses, etc. In some embodiments, the account database 304 may also store transaction history associated with each payment account that may be used by the fraud detection module 314 to determine if a transaction is fraudulent or not.

The first processing rules 312 may include rules that may be used by the authorizing entity computer 112 to determine if a transaction can be authorized or declined. In some embodiments, the first processing rules 312 may include fraud rules. For example, the fraud detection module 314 may utilize fraud rules to determine if a transaction is fraudulent. The first processing rules 312 may also include rules associated with each product type such as credit, debit, prepaid, etc.

The fraud detection module 314 may be configured to detect if a transaction is fraudulent. For example, the fraud detection module 314 may use fraud rules to determine, for example, if the transaction was conducted by an authorized user using an authorized payment account based on the transaction history associated with the payment account used for the transaction.

The authorization module 316 may be configured to make a decision on whether a transaction can be authorized (e.g., approved) or declined. For example, the authorization module 316 may authorize a transaction based on an input from the fraud detection module, e.g., if the transaction is not fraudulent. Similarly, the authorization module 316 and the processor may decline a transaction based on the input from the fraud detection module that the transaction is fraudulent. It will be understood that the transaction can be declined based on other factors such as insufficient account balance, expired account numbers, mismatch of CVV or dCVV, etc.

Figure 4:
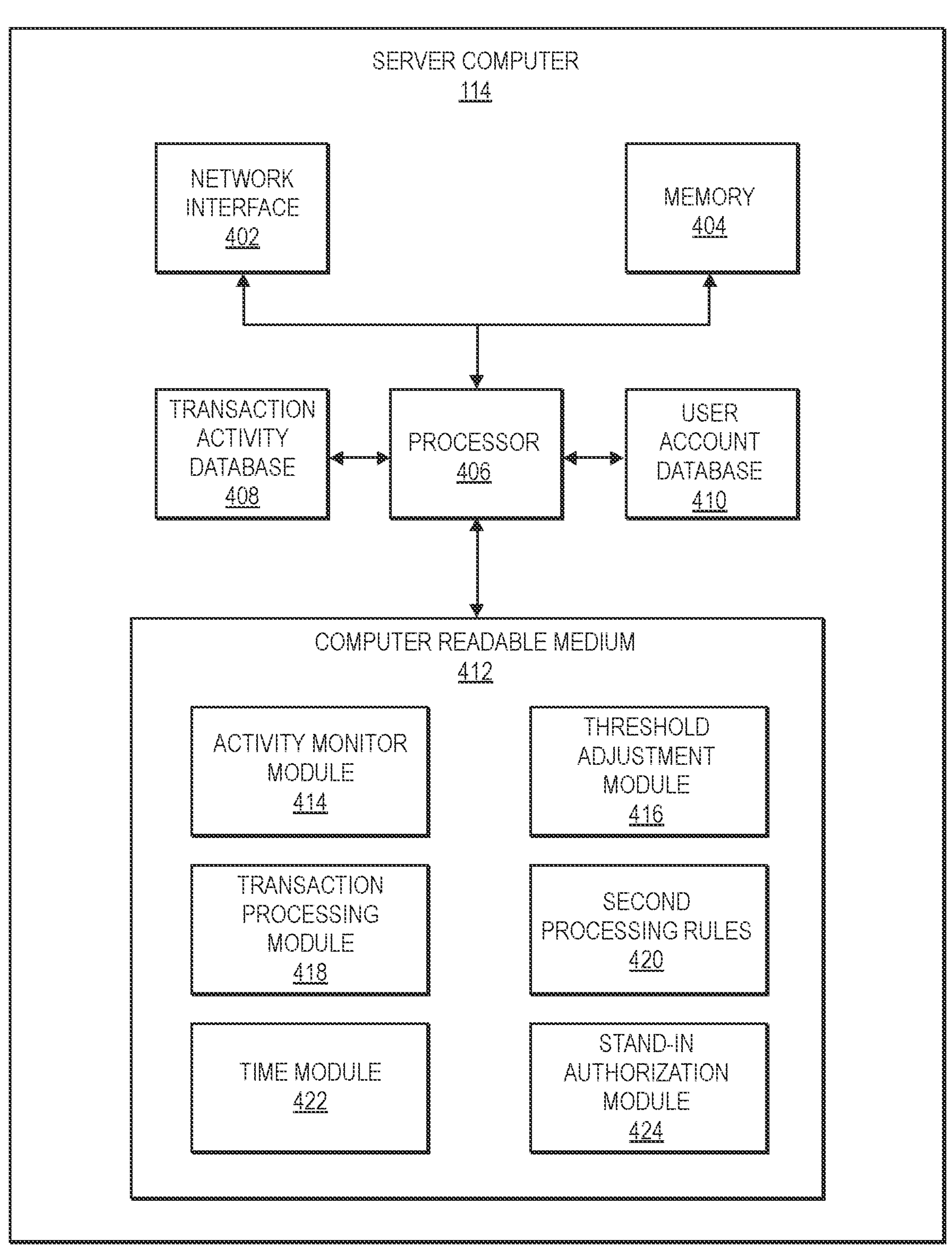
FIG. 4 illustrates a block diagram of a server computer that may be used for implementing embodiments of the invention.

FIG. 4 illustrates at least some components of a server computer that may be used for implementing embodiments of the invention.

The server computer 114 may include a network interface 402, a memory 404, a processor 406, a transaction activity database 408, an account history database 410 and a computer readable medium 412. In some embodiments, the server computer 114 is shown to be part of the processing network 110, however, in some other embodiments, the server computer 114 may be part of the resource provider computer 106 or the transport computer 108.

The server computer 114 may be configured to monitor electronic transaction activity of a plurality of transactions associated with an authorizing entity to detect processing delays or other problems, and provide intelligent authorization decisions on behalf of the authorizing entity. The network interface 402 may be configured to interface with other entities, such as, the authorizing entity computer 112, transport computer 108, resource provider computer 106, etc. for exchange of data and information (e.g., transaction and authorization related data) using various communication networks. The memory 404 may comprise any combination of volatile and/or non-volatile memory such as RAM, DRAM, ROM, flash, or any other suitable memory.

The processor 406 or processing elements may be configured to execute instructions or code in order to implement methods, processes or operations. The computer readable medium 412 may comprise code, executable by the processor 406, for implementing methods using embodiments of the invention. The CRM 412 may comprise an activity monitor module 414, a threshold adjustment module 416, a transaction processing module 418, second processing rules 420, a timer module 422, and a stand-in authorization module 424.

The processor 406 may further be in communication with the transaction activity database 408 and the account history database 410. In some embodiments, the transaction activity database 408 and/or the account history database 410 may be external to the server computer 114 (e.g., cloud storage). The transaction activity database 408 may store an authorizing entity's (e.g., issuer, processor or another entity) transaction activity data over time which may be used to determine a baseline for the authorizing entity. The account history database 410 may store historical data associated with different payment accounts which may be used to generate a custom profile for each user such as each user's spending behavior. It may also include a short term database which stores transaction data associated with transactions in which authorization request messages have been sent to authorizing entity computers, but for which authorization response messages for them have not yet been received. It may also store advice messages that are being temporarily held until the authorizing entity computer is operating normally.

The activity monitor module 414 may be configured to monitor transaction activity of a plurality of transactions. For example, the activity monitor module 414 may continuously monitor authorization traffic (e.g., authorization requests and responses) of the authorizing entity computer 112. In some embodiments, the activity monitor module 414 may monitor authorization traffic intermittently or periodically. In some embodiments, the transaction activity of a plurality of transactions may be stored in the transaction activity database 408 to determine a baseline behavior of the authorizing entity computer 112. In some embodiments, the activity monitor module 414 can set threshold indicators based on the monitored activity from the authorizing entity computer, as described above with respect to FIG. 2.

The threshold adjustment module 416 may be configured to generate and/or adjust one or more of the time and/or value thresholds described above. In one embodiment, the aggregated transaction activity data is stored in the transaction activity database 408.

The transaction processing module 418 may be programmed to cause the server computer 114 to perform authorization, and optionally clearing and settlement processing. This can include routing authorization request messages to the correct authorizing entity computers, and routing authorization response messages to the correct access devices and/or resource provider computers.

Second processing rules 420 may be used to process the transactions once stand-in processing is invoked. In one embodiment, the second processing rules 420 may include fraud rules or authorization rules to determine if the transaction should be authorized. The second processing rules 420 can be provided by one or more authorizing entity computers associated with one or more authorizing entities.

The timer module 422 can be programmed to cause the server computer 114 to start timers with respect to the transmission of authorization request messages to authorizing entity computers.

Stand-in authorization module 424 may be programmed to cause the server computer 114 to make authorization decisions on behalf of an authorizing entity. For example, using the second processing rules 420 and after evaluating an authorization request message using the time and value thresholds, the stand-in authorization module 424 may authorize or decline a transaction when the authorizing entity computer 112 is malfunctioning or does not respond. In some embodiments, the stand-in authorization module 424 may generate an authorization response message that may be transmitted back to the resource provider computer 106 via the transport computer 108. The authorization response may include a result of the authorization such as an approval or a decline. In some embodiments, the authorization response may also include a reason code which may indicate a reason for the decline of the transaction.

Note that when the authorizing entity computer 112 is behaving normally, the server computer 114 may perform the functions of a processing network. For example, the server computer 114 may be responsible for providing clearing and settlement services with the transport computer 108 and the authorizing entity computer 112.

Although the above-noted examples can relate to payment transactions, embodiments of the invention can also apply in other contexts in which the transmission of authorization request message to an authorizing entity computer can continue despite possible delays in responses from the authorizing entity computer. For example, the authorization request messages could be requests for authorization to secure data held in a secure database. The authorization entity computer could be a primary decisioning computer while the server computer can be a secondary decisioning computer that serves as a backup to the authorizing entity computer.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

receiving, by a server computer from a resource provider computer, an authorization request message comprising a value for a transaction;

transmitting, by the server computer, the authorization request message comprising the value to an authorizing entity computer;

determining, by the server computer, that an authorization response message in reply to the authorization request message has not been received, and that a time since the authorization request message was transmitted exceeds a time threshold;

if the value in the authorization request message is below or equal to a value threshold, generating, by the server computer, an authorization response message on behalf of the authorizing entity computer and transmitting the authorization response message to the resource provider computer; and if the value in the authorization request message is above the value threshold, then continuing waiting for an authorization response message from the authorizing entity computer, wherein if the time since the authorization request message was transmitted exceeds a maximum time threshold, and if other authorization response messages to other authorization request messages transmitted to the authorizing entity computer have not been received, then transmitting authorization responses messages on behalf of the authorizing entity computer for all subsequently received authorization requests messages, wherein the method further comprises:

stopping or decreasing, by the server computer, transmission of number and/or type of advice messages associated with transactions to the authorizing entity computer when the time exceeds the time threshold while continuing to wait for the authorization response message.

2. The method of claim 1, wherein the value threshold increases as the authorizing entity computer's response time over a recent time period increases.

3. The method of claim 1, wherein the value threshold decreases as the authorizing entity computer's response time over a recent time period decreases.

4. The method of claim 1, wherein the server computer stops:

transmission of advice messages associated with transactions to the authorizing entity computer when the time exceeds the time threshold.

5. The method of claim 1, wherein the value in the authorization request message is below or equal to the value threshold.

6. The method of claim 1, wherein the authorization request message comprises a token or a credential.

7. The method of claim 1, wherein when the value in the authorization request message is above the value threshold, then:

receiving the authorization response message from the authorizing entity computer; and transmitting the authorization response message to the resource provider computer.

8. The method of claim 1, wherein the time threshold is at least ten seconds.

9. The method of claim 1, the server computer stops transmission of a subset of available advice messages associated with transactions to the authorizing entity computer when the time exceeds the time threshold.

10. The method of claim 9, wherein as the authorizing entity computer's response time over a recent time period increases, a number of available advice messages that are stopped increases.

11. The method of claim 1, further comprising:

receiving, by, the server computer, a signal that the authorizing entity computer is operating normally; and stopping the generation and transmission of authorization response messages on behalf of the authorizing entity computer.

12. A method comprising:

receiving, by a server computer from a resource provider computer, an authorization request message comprising a value for a transaction;

transmitting, by the server computer, the authorization request message comprising the value to an authorizing entity computer;

determining, by the server computer, that an authorization response message in reply to the authorization request message has not been received, and that a time since the authorization request message was transmitted exceeds a time threshold;

if the value in the authorization request message is below or equal to a value threshold, generating, by the server computer, an authorization response message on behalf of the authorizing entity computer and transmitting the authorization response message to the resource provider computer; and if the value in the authorization request message is above the value threshold, then continuing waiting for an authorization response message from the authorizing entity computer, wherein the value threshold dynamically adjusts in real time based on authorization request messages received by the server computer and whether authorization response messages responsive to the authorization request messages are received by the server computer, wherein the method further comprises:

stopping or decreasing, by the server computer, transmission of number and/or type of advice messages associated with transactions to the authorizing entity computer when the time exceeds the time threshold while continuing to wait for the authorization response message.

13. A method comprising:

receiving, by a server computer from a resource provider computer, an authorization request message comprising a value for a transaction;

transmitting, by the server computer, the authorization request message comprising the value to an authorizing entity computer;

determining, by the server computer, that an authorization response message in reply to the authorization request message has not been received, and that a time since the authorization request message was transmitted exceeds a time threshold;

if the value in the authorization request message is below or equal to a value threshold, generating, by the server computer, an authorization response message on behalf of the authorizing entity computer and transmitting the authorization response message to the resource provider computer; and if the value in the authorization request message is above the value threshold, then continuing waiting for an authorization response message from the authorizing entity computer, wherein the value threshold dynamically adjusts using authorization request message average response times over time intervals, wherein the method further comprises:

stopping or decreasing, by the server computer, transmission of number and/or type of advice messages associated with transactions to the authorizing entity computer when the time exceeds the time threshold while continuing to wait for the authorization response message.

14. A server computer comprising a processor and a non-transitory computer readable medium comprising code, executable by the processor, for implementing a method comprising:

receiving, from a resource provider computer, an authorization request message comprising a value for a transaction;

transmitting the authorization request message comprising the value to an authorizing entity computer;

determining that an authorization response message in reply to the authorization request message has not been received, and that a time since the authorization request message was transmitted exceeds a time threshold;

if the value in the authorization request message is below or equal to a value threshold, generating an authorization response message on behalf of the authorizing entity computer and transmitting the authorization response message to the resource provider computer; and if the value in the authorization request message is above the value threshold, then continuing waiting for an authorization response message from the authorizing entity computer, wherein the value threshold dynamically adjusts in real time based on authorization request messages received by the server computer and whether authorization response messages responsive to the authorization request messages are received by the server computer in a timely manner, wherein the method further comprises:

stopping or decreasing transmission of number and/or type of advice messages associated with transactions to the authorizing entity computer when the time exceeds the time threshold while continuing to wait for the authorization response message.

15. The server computer of claim 14, wherein the value threshold increases as the time threshold increases for subsequent transactions.

16. The server computer of claim 14, wherein the value threshold decreases as the time threshold decreases for subsequent transactions.

17. The server computer of claim 14, wherein when the value in the authorization request message is above the value threshold, then:

receiving the authorization response message from the authorizing entity computer; and transmitting the authorization response message to the resource provider computer.

18. The server computer of claim 14, wherein the time threshold is at least ten seconds.

19. The method of claim 1, wherein the transaction is a payment transaction.

20. The method of claim 19, wherein the value is a transaction amount and the authorizing entity computer is an issuer computer.

* * * * *